March 9, 1965 P. C. SETZLER 3,172,329
CONE-SPREAD SCREW-THREAD INSERT
Filed Feb. 16, 1962
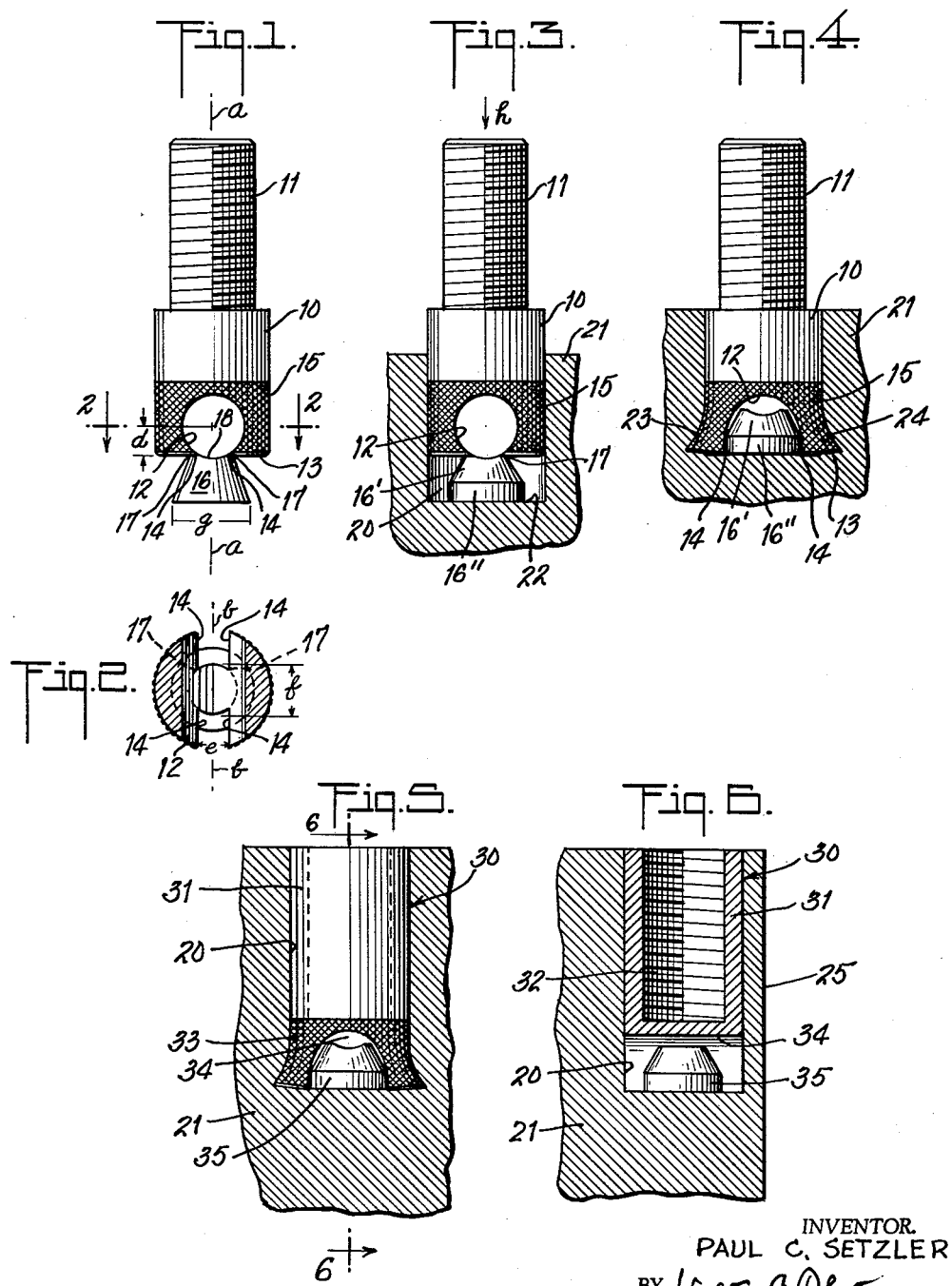
INVENTOR.
PAUL C. SETZLER
BY Walter S. Pleston
ATTORNEY

United States Patent Office 3,172,329
Patented Mar. 9, 1965

3,172,329
CONE-SPREAD SCREW-THREAD INSERT
Paul C. Setzler, Sherman, Conn., assignor to Heli-Coil Corporation, Danbury, Conn., a corporation of Delaware
Filed Feb. 16, 1962, Ser. No. 173,786
3 Claims. (Cl. 85—72)

The invention relates to screw thread inserts and more particularly to cone-spread expansible inserts for use in more or less soft materials such as plastics, die castings, aluminum and the like. Inserts of the type here under consideration are usually inserted in holes formed in a work piece rather than molded into the parent material.

In one form of conventional devices for the indicated purpose, an insert consists of a unitary shell-like body wtih an axial, throughgoing hole which is tapped through the major portion of its length, and an integral frusto-conical expander plug having its smaller end connected with the body of the insert by a frangible wall, so that when the insert with the bottom of the plug leading is inserted in the hole of the work piece and the whole insert is subjected to an axial pressure, the frangible wall will break and the frusto-conical plug will enter the non-threaded portion of the hole of the shell-like body so as to expand the adjacent body end and to anchor it in the work piece whereupon a bolt may be screwed into the threaded hole.

Such conventional inserts have certain drawbacks in that it happens e.g. if the insert is being installed close to the edge of the work piece the latter breaks out under the annular force exerted by the insert. Furthermore, the conventional devices provide internal threads only and cannot be readily employed as a solid stud or with other configurations which do not permit the axial bore.

The invention aims to avoid these and other drawbacks and to provide unitary inserts in which the cone-expanding concept can be applied regardless whether the insert is formed as a shell with a tapped thread or as a stud or other suitable configuration.

According to the invention, the insert is provided with a through hole extending perpendicular to the insert axis so, however, that the hole intersects the adjacent end face of the insert body and forms two parallel edges thereof. Thin frangible wall pieces are formed between the smaller end of the inclined portion of an integral expander plug and the edges, respectively, of the hole. Axial pressure applied to the insert will cause the frangible wall pieces to fracture, allowing the expander plug to enter the cavity provided by the through hole, and causing a spreading force on the two legs of the insert separated by the mentioned hole, which force acts perpendicular to the axis of the insert in two opposite directions.

A further purpose of the invention is the provision of a cylindrical section added to the base of the frusto-conical plug in order to form a surface which can be gripped by the two legs of the expanded insert after installation in the parent material, thereby retaining the legs spread by the expander plug even though the insert may be moved within limits in relation to the accepting hole, this providing constant strength notwithstanding such relative motion.

Further objects and details of the invention will be apparent from the description given hereinafter and the accompanying drawing illustrating some embodiments thereof by way of example. In the drawing:

FIG. 1 is a side elevation of a stud-forming insert according to the invention;

FIG. 2 is a cross-section along line 2—2 of FIG. 1;

FIG. 3 is a side elevation of a modification, inserted in a hole of a work piece before being expanded;

FIG. 4 is the same device as in FIG. 3 with, however, expanded legs anchoring the insert in the work piece;

FIG. 5 is a side elevation of another embodiment provided with an interior screw thread and anchored in a work piece, and FIG. 6 is a section along line 6—6 of FIG. 5.

Referring now to the drawing, FIG. 1 shows an expansible, one-piece insert including a stud-forming portion. The insert, made preferably of brass or other suitable material, comprises a cylindrical body 10 with the stud portion 11 extending upwards from the cylinder 10 and with a plane face at its lower end. The body portion opposite the stud or screw-threaded portion is provided with a through-going transverse, substantially cylindrical, bore 12 at right angles to the axis $a$—$a$ of the insert. The axis $b$ of the bore is spaced from the lower end face 13 of the cylindrical body a distance $d$ which is less than the length of a radius of the bore 12. Thereby two parallel edges 14, 14 of the surface 13 are formed which are also parallel to the axis $b$ and as clearly seen in the drawing, project inwards in relation to the maximum width of the bore, and the cross-section of the bore in the cylindrical body is a segment of a circle bordered by a major arc and the plane of the lower surface 13. The cylindrical body 10 is knurled on its outside in a zone 15 surrounding the bore 12. A frusto-conical solid plug 16 is integral with the body 10. Its upper, i.e. its smaller end is of a diameter $f$ approximating the spacing $e$ of the edges 14 from each other, that is to say, the diameter may be slightly smaller than or like that spacing but preferably is slightly larger. The major diameter $g$ of the plug must not be larger and, in most instances, will be smaller than the diameter of the cylindrical body 10. The upper end of the plug 16 is connected to the edges 14 by small thin wall pieces 17 which are frangible. The upper surface of the plug is provided with a part-cylindrical recess or indentation 18 which completes the bore 12 to a whole inner cylindrical surface. This indentation is created when the transverse hole is drilled through the cylindrical body 10. Thus, it will be clear that the whole stud-forming insert with its transverse bore and the plug can be produced as one piece from a round stock on one and the same automatic or semi-automatic machine such as a lathe, without rechucking the individual piece.

The preferred form of the stud-forming insert shown in FIGS. 3 and 4 differs from the form of FIGS. 1 and 2 merely in that the plug has a frusto-conical portion 16' similar to the plug 16 and a cylindrical portion 16" in continuation of the larger or foot end of the portion 16'. The reason for this form of the plug and its effect will be explained later on. In all other respects the form of FIGS. 3 and 4 is exactly similar to the form of FIGS. 1 and 2 wherefore similar parts are denoted by the same reference numerals and do not require an additional description.

In FIG. 3 the insert is located in a hole 20 of a work piece 21 in which the insert is to be secured. The plug bears with its lowermost face on the bottom 22 of the hole 20. If now axial pressure is exerted on the insert, the frangible wall pieces 17 will break and the plug 16', 16", will enter the bore 12 and urge the lower portion of the cylindrical body apart so as to form two legs 23 and 24 which squeeze in opposite directions, at right angles to the axis of the bore 12, into the material of the work piece 21. It will be noticed that the spreading of the legs 23, 24 starts from the edges 14, 14 of the surface 13 of the cylindrical body, and that in the final position of FIG. 4 the edges 14, 14 bear against the cylindrical portion 16" of the plug. When in the form of FIG. 1 the insert after its installation moves somewhat, as it happens, in relation to the receiving hole in the work piece, the cylindrical body portion may tend to separate from the plug owing to the taper of the latter. In consequence, the spread legs of the body will lose their support on the plug and their resistance to any motion will be reduced. Such happening is avoided, at least to a large extent, by the form of the plug in FIGS. 3 and 4. As stated above, when the insert is properly installed as in FIG. 4, the edges 14 bear against a cylindrical rather than a tapering surface. Therefore, even if the insert body tends to move axially in relation to the plug, the legs 23 and 24 will remain forcibly spread so long as the edges 14 are supported by the cylindrical plug portion 16''.

The insert just described offers considerable advantages over the conventional forms of cone spread, expansible, screw thread inserts. The transverse bore in which the cone enters renders it possible to provide a one piece, stud insert, whereas with the conventional inserts it was necesary to screw into the insert a separate stud, if such was needed. Furthermore, the cavity made by the transverse hole permits deformation of the accepting hole in plastic materials whereby the stress may be somewhat relieved. It has also been found that slightly less installation force is required for the insert according to the invention where a bi-directional force rather than an annular force is exerted as in conventional devices in order to expand the insert. The pull-out characteristic of the insert according to the invention is constant to a certain degree whereas there is a critical load to the conventional inserts at which the insert would fail. Finally, and this will be explained in particular in connection with the description of FIGS. 5 and 6, due to the bidirectional force exerted by the cone on the insert legs, the insert can be oriented to take advantage of thicker wall sections in one part of a work piece. An example would be an installation close to the edge of the part which would break out under an annular force such as exerted by conventional inserts. By aligning the transverse hole at right angles to the wall, the insert according to the invention would not break out.

All these advantages except those specific to the stud form apply also to an insert which is shaped with an interior or tapped rather than an exterior or stud threading. Such an insert design is shown in FIGS. 5 and 6. In this form the insert has a cylindrical body in general denoted by 30. This body is provided in its upper portion 31 with an interior screw thread 32, whereas the lower knurled body portion 33 is provided with the transverse bore 34. It is preferred that a solid bottom portion is left between the tapped hole and the transverse bore as shown in FIG. 6. The arrangement of the plug 35 and its connection with the body portion 33 prior to the latter being pressed down on the plug, is the same as described with respect to the similar parts in FIGS. 1 to 4. The insert is located in the hole 20 of the work piece 21 and shown after pressure is exerted thereon in order to secure it in its final position. From a comparison of FIGS. 5 and 6 it clearly appears that the spreading occurs only in two opposite directions at right angles to the bore 34 which is directed at right angles to the wall 25 of the work piece 21, wherefore no danger exists of the insert breaking out of the work piece.

It will be apparent to those skilled in the art that many modifications and alterations of the structure illustrated and described can be made without departure from the essence and spirit of the invention which for that reason shall not be limited but by the scope of the appended claims.

I claim:

1. An expansible insert comprising, as a unitary structure, a cylindrical body having an upper end portion for the attachment of an extraneous member and a lower plane end face opposite said end portion, and an integral frusto-conical plug having its smaller end face adjoining said lower end face of said body, said body having a lower portion solid except for one diametric transverse throughgoing bore of circular-segmental cross-section provided in said solid portion at right angles to the axis of said cylindrical body, the axis of said bore being spaced upwards from said end face less than the length of a radius of said bore so as to form two parallel substantially sharp edges of said end face, said frusto-conical plug having a minor diameter approximating the spacing of said edges and a major diameter smaller than that of said cylindrical body and having in its smaller end face a part-cylindrical recess forming with the median portion of said bore a complete hollow-cylindrical surface, and thin frangible wall pieces connecting the smaller plug end to said edges, respectively, said plug being so dimensioned as to expand the lower portion of said body adjacent said bore and to be wholly encased in said originally circular-segmental cross-section of said bore when said wall pieces are broken upon said plug being urged into said bore in the direction of said body axis.

2. An expansible insert as in claim 1, said upper end portion being a screw-threaded, stud-forming extension of said body, and said unitary structure being solid except for said bore and said recess.

3. An expansible insert as in claim 1, said upper end portion being provided with an interiorly screw-threaded bore co-axial with said body, and an intermediate solid cylindrical portion extending between said axial and said transverse bores.

References Cited in the file of this patent

UNITED STATES PATENTS

| | | |
|---|---|---|
| 1,164,322 | Yeatman | Dec. 14, 1915 |
| 1,621,598 | Phillips | Mar. 22, 1927 |
| 1,808,318 | Pleister | June 2, 1931 |
| 2,108,842 | Bazzoni | Feb. 22, 1938 |
| 2,879,686 | Lewis et al. | Mar. 31, 1959 |
| 2,900,863 | Maynard | Aug. 25, 1959 |
| 3,089,377 | Engstrom | May 14, 1963 |

FOREIGN PATENTS

| | | |
|---|---|---|
| 15,163 | Great Britain | June 29, 1909 |